United States Patent
Patsouris et al.

(10) Patent No.: US 9,366,183 B2
(45) Date of Patent: Jun. 14, 2016

(54) SYSTEM FOR ATTACHING A TURBOJET ENGINE SPINNER

(71) Applicant: SNECMA, Paris (FR)

(72) Inventors: Emmanuel Patsouris, Melun (FR); Jacques Rene Bart, Soisy sur Seine (FR)

(73) Assignee: SNECMA, Paris (FR)

( * ) Notice: Subject to any disclaimer, the term of this patent is extended or adjusted under 35 U.S.C. 154(b) by 548 days.

(21) Appl. No.: 13/845,808

(22) Filed: Mar. 18, 2013

(65) Prior Publication Data

US 2013/0323063 A1    Dec. 5, 2013

(30) Foreign Application Priority Data

Apr. 5, 2012 (FR) ...................................... 12 53164

(51) Int. Cl.
| | |
|---|---|
| F02C 7/00 | (2006.01) |
| F02C 7/04 | (2006.01) |
| F01D 5/30 | (2006.01) |
| F01D 5/06 | (2006.01) |

(52) U.S. Cl.
CPC ... *F02C 7/04* (2013.01); *F01D 5/06* (2013.01); *F01D 5/3015* (2013.01); *F05D 2220/36* (2013.01); *F05D 2260/33* (2013.01); *Y02T 50/673* (2013.01)

(58) Field of Classification Search
CPC ...... F01D 5/3015; F02C 7/04; F05B 2220/33; F05B 2260/303; Y02T 50/673
USPC ....................... 416/219 R, 220 R, 245 R, 144
See application file for complete search history.

(56) References Cited

U.S. PATENT DOCUMENTS

| | | | |
|---|---|---|---|
| 6,398,500 B2 * | 6/2002 | Pedersen et al. .......... | 416/220 R |
| 2004/0161339 A1 | 8/2004 | Breakwell et al. | |
| 2007/0253822 A1 | 11/2007 | Buisson et al. | |
| 2009/0087313 A1 | 4/2009 | Belmonte et al. | |
| 2009/0269202 A1 | 10/2009 | Borzakian et al. | |
| 2010/0215507 A1 | 8/2010 | Breakwell | |

FOREIGN PATENT DOCUMENTS

| | | |
|---|---|---|
| EP | 1 849 962 A1 | 10/2007 |
| EP | 2 028 375 A2 | 2/2009 |
| EP | 2 221 247 A2 | 8/2010 |
| FR | 2 819 290 | 7/2002 |
| GB | 2 398 353 A | 8/2004 |
| GB | 2459366 A | 10/2009 |

OTHER PUBLICATIONS

French Preliminary Search Report issued Jan. 15, 2013, in Patent Application No. FR 1253164, filed Apr. 5, 2012 (with English Translation of Category of Cited Documents).

\* cited by examiner

*Primary Examiner* — Kenneth Bomberg
*Assistant Examiner* — Dapinder Singh
(74) *Attorney, Agent, or Firm* — Oblon, McClelland, Maier & Neustadt, L.L.P.

(57) ABSTRACT

A rotor of a turbomachine including a spinner which is attached removably to the upstream end of the rotor by an attachment system is provided. The attachment includes a dog clutch and a rotation-proofing system preventing the spinner from rotating with respect to the rotor.

10 Claims, 3 Drawing Sheets

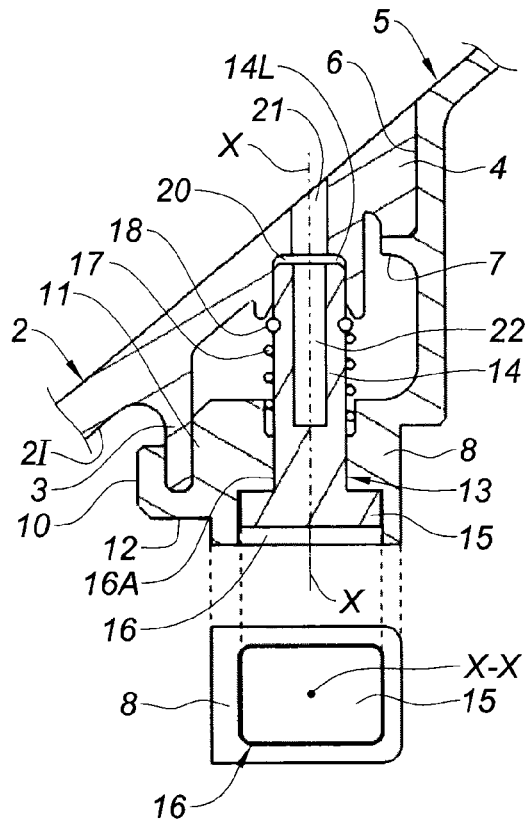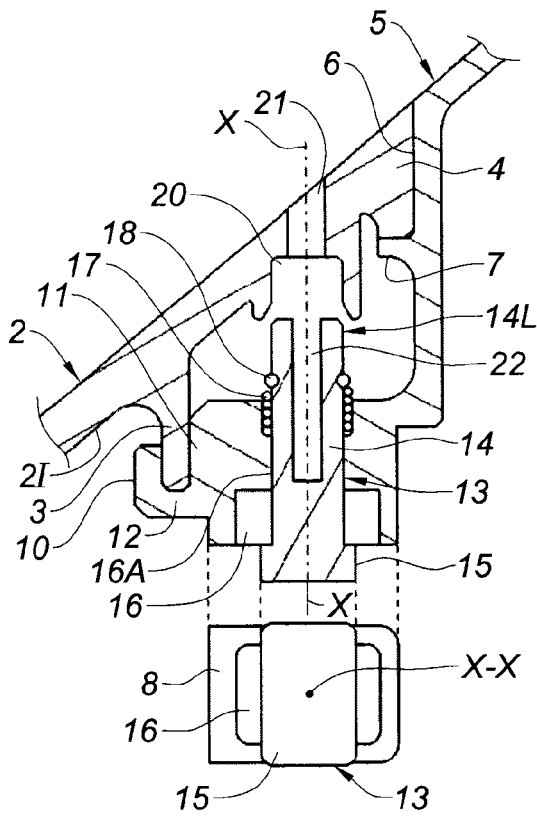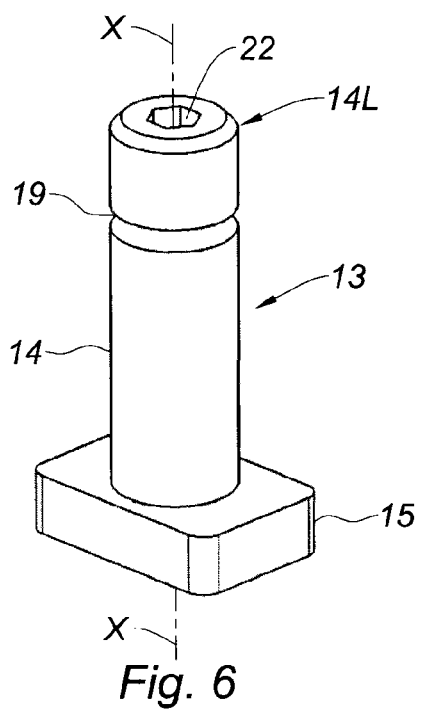

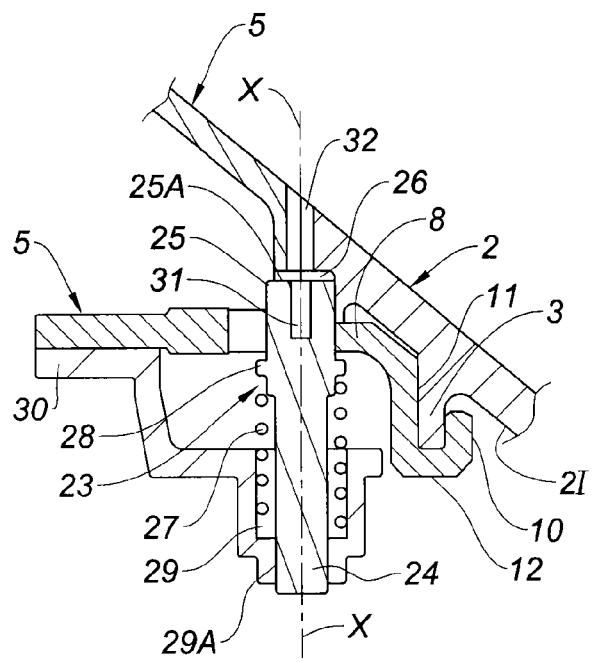
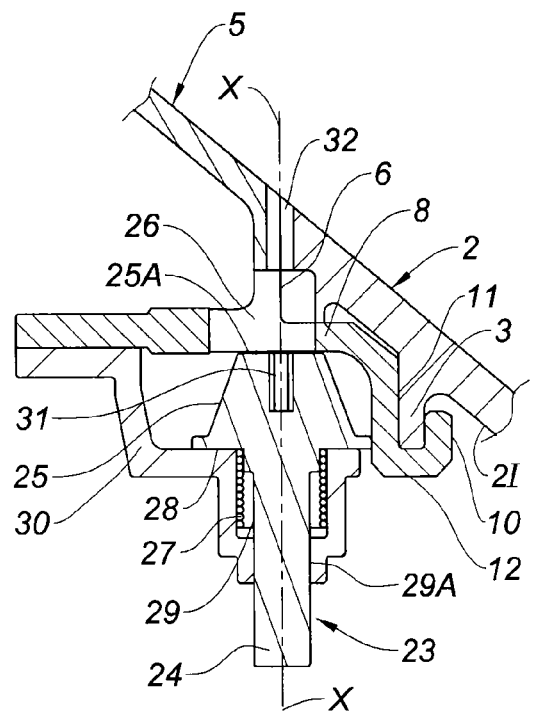
Fig. 7　　　　Fig. 8
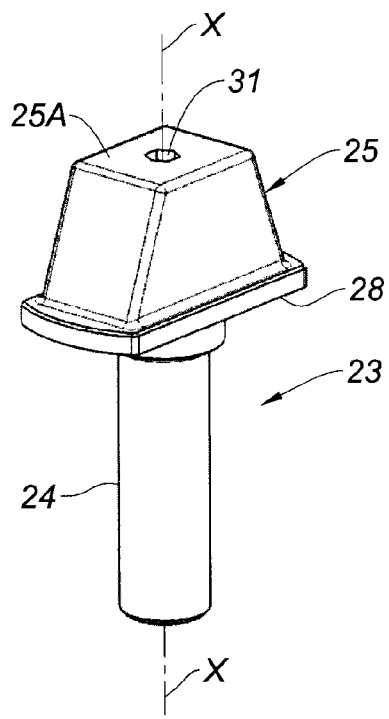
Fig. 9

SYSTEM FOR ATTACHING A TURBOJET ENGINE SPINNER

BACKGROUND OF THE INVENTION

The present invention relates to turbomachines and, more particularly, to an upstream rotor of such turbomachines.

Although the present invention is particularly well suited to aircraft turbine engines, it is not, however, restricted to that aeronautical application.

In a known way, a turbine engine comprises a gas generator formed of one or more sets of rotors rotating about a common axis. Each set, known as a spool, is made up of a compressor and of a turbine which are connected by a shaft or a drum and positioned one upstream of and the other downstream of a combustion chamber in relation to the flow of gas streams through the turbine engine. Associated with this gas generator is a fan that it drives. When the fan rotor is positioned at the front of the turbine engine, the air inlet of the generator is situated downstream of this rotor.

Moreover, it is known that the fan rotor comprises a spinner which forms the most upstream rotating part of the turbine engine. Through its shape, the spinner improves the aerodynamics of the turbine engine and, through a centrifugal effect, allows most foreign bodies entering the turbine engine to be deflected into a secondary stream.

It is also known that the spinner of a turbine engine is generally attached to the fan rotor by axial clamping, this being obtained by connecting a clamping plate secured to the spinner to a clamping plate connected to the rotor using a set of screws oriented along the longitudinal axis of the turbine engine. Each screw head requires the formation of a flat surface, using a spot-facing operation, allowing it to bear against the body of the spinner and be recessed therein in order to limit aerodynamic losses.

However, despite these precautions, the screw head and the spot faces made in the spinner are still "visible" to the incoming air stream. Further, because of the axial orientation of the screws (i.e. because they are oriented in the same direction as the incoming air stream), the frontal surface of the screws visible to the air stream is at a maximum, encouraging aerodynamic losses and increasing the drag of the turbine engine and, therefore, the fuel consumption thereof.

Moreover, recourse to a plurality of screws for axially clamping the spinner to the fan rotor means that it takes a great deal of time to fit and to remove the spinner. Now, because the spinner is the first removable component on the upstream part of the fan rotor, it is frequently required to be removed.

What is more, the use of screws for axially clamping the spinner entails recourse to tooling capable of measuring with precision the tightening torque applied, so as to prevent any damage to the fastening. The use of this special-purpose tooling increases the time that the operations take and, therefore, increases aircraft maintenance costs.

SUMMARY OF THE INVENTION

It is an object of the present invention to remedy these disadvantages and, notably, to reduce the aerodynamic disturbances to the air stream flowing over the spinner of a turbine engine while at the same time making it easier for said spinner to be fitted to and removed from said engine.

To this end, according to the invention, the upstream rotor of a turbomachine, of longitudinal axis L-L, comprising a spinner coaxial with the axis L-L and which is attached removably to the upstream end of the rotor by attachment means, is notable in that the said attachment means comprise a dog clutch and rotation-proofing means preventing the spinner from rotating with respect to the rotor, the rotation-proofing means comprising at least two rotation-proofing pegs, preferably diametrically opposed, each able to occupy at least an unlocked position, allowing the spinner to rotate with respect to the rotor, and a locked position, preventing any rotation of the spinner with respect to the rotor, the rotation-proofing pegs being urged into the locked position by elastically deformable means, such as springs.

Thus, by virtue of the invention, the axial clamping—which entails recourse to a plurality of axially directed screws—is replaced with a dog clutch attachment that holds the spinner axially with respect to the corresponding rotor. Use of a dog clutch means there is no longer any need for a plurality of axial screws (or the creation of the corresponding spot faces), thus making the fitting and removal of the spinner substantially easier, leading to a reduction in the maintenance time for the corresponding turbomachine. Further, by virtue of the invention, the outer surface of the spinner is perfectly, or almost, smooth because there are no axially directed screws or associated spot faces. The aerodynamic disturbances of the gas stream flowing over the spinner are therefore appreciably reduced, increasing turbomachine performance.

In addition, the spinner advantageously comprises a plurality of radial teeth, preferably evenly distributed about a circumference thereof.

For preference, the rotor comprises a flange, preferably frustoconical, which comprises a plurality of radial teeth, for example evenly distributed about a circumference thereof, and at least one annular groove intended to accommodate the radial teeth of the spinner to form the dog clutch.

Thus, the spinner can be mounted on the flange of the rotor using the dog clutch connection without an interference with the rotation-proofing means. The spinner can be engaged on the flange axially and then pivoted about the axis L-L to bring the teeth of the spinner to face those of the flange. This dog clutch connection holds the spinner axially with respect to the rest of the fan rotor.

The rotation-proofing means comprise at least two rotation-proofing pegs, preferably diametrically opposed in order to ensure the dynamic balancing of the rotor, each able to occupy at least an unlocked position that allows the spinner to rotate with respect to the rotor, and a locked position that prevents any rotation of the spinner with respect to the rotor.

In particular, the transition of the rotation-proofing pegs from the unlocked position to the locked position and vice versa can be obtained by rotating the pegs one quarter of a turn about their axis.

Thus, by virtue of the invention, the spinner of the upstream rotor can be fitted and removed via two operations which are simple and require no special-purpose and expensive tooling, namely:

by rotating the rotation-proofing pegs, for example using an Allen key, to lock or unlock the rotation-proofing means. There are as many independent rotation movements as the rotation-proofing pegs attachment means comprise; and by rotating the spinner to engage or disengage the dog clutch coupling.

As a further preference, the rotation-proofing means comprise at least two main housings in which the respective heads of the corresponding rotation-proofing pegs can be housed when these pegs are in the locked position, and against the outer edges of which the respective heads of the corresponding rotation-proofing pegs are able to rest when these pegs are in the unlocked position.

In one preferred embodiment according to the present invention, the main housings are formed wholly in the upstream flange and have a bottom through which there is made a through-hole in which the associated rotation-proofing peg can slide, as a sliding fit.

The attachment means may further comprise at least two auxiliary housings which are formed in the internal wall of the spinner and which are intended to accommodate the free end of the corresponding rotation-proofing pegs, when these are in the locked position.

In another embodiment according to the present invention, the main housings are formed in the upstream flange and the spinner once the two are joined together.

Whatever embodiment of the invention is considered, the spinner advantageously comprises at least two holes preferably running radially, and which open onto the outer surface of the spinner and are able to be positioned respectively facing a hole for the rotation-proofing pegs which is formed in their outwardly facing end and able to accept an assembly tool for translationally moving the corresponding peg and turning it about its axis.

Thus, these holes, which for example measure a few millimeters in diameter, which are oriented radially for the passage of an assembly tool, represent an extremely small (or even near-zero) surface area exposed to the air stream.

In addition, and again whatever embodiment of the invention is considered, the rotation-proofing means advantageously comprise at least two compression springs through which the corresponding rotation-proofing pegs respectively pass, which springs can be compressed, when the associated pegs are in the unlocked position, and can be at least partially relaxed when the pegs are in the locked position.

BRIEF DESCRIPTION OF THE DRAWINGS

The figures of the attached drawing will make it easy to understand how the invention may be embodied. In these figures, identical references denote elements that are similar.

FIGS. 4 and 5 depict, in a schematic axial section, the rotation-proofing means of the spinner of FIG. 1, according to a first embodiment of the invention, in a locked position and an unlocked position, respectively.

FIG. 6 illustrates, in a schematic perspective view, a rotation-proofing peg of the rotation-proofing means of FIGS. 4 and 5.

FIGS. 7 and 8 depict, in schematic axial section, a second embodiment of the rotation-proofing means of the spinner according to the present invention, in the locked position and in the unlocked position, respectively.

FIG. 9 is a schematic perspective view of a rotation-proofing peg according to the second embodiment of the rotation-proofing means of FIGS. 7 and 8.

MORE DETAILED DESCRIPTION

Figure 1:
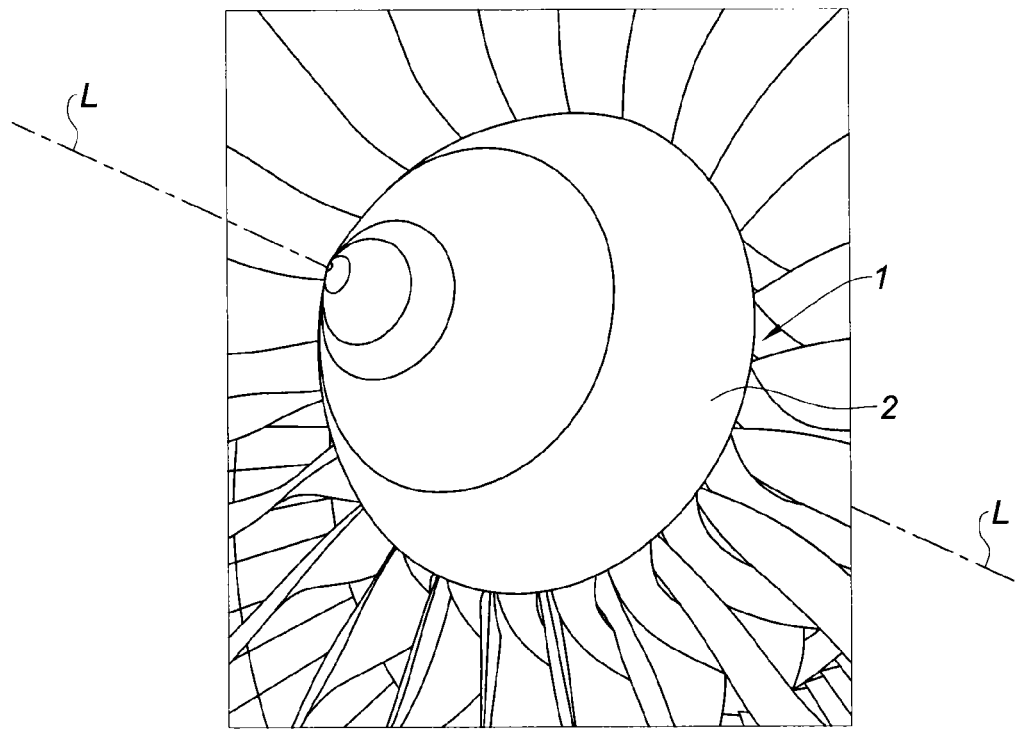
FIG. 1 is a partial schematic view in perspective of a fan rotor of a turbine engine equipped with a spinner according to the present invention.

FIG. 1 partially depicts the fan rotor 1 of an aircraft turbine engine of longitudinal axis L-L.

The fan rotor 1 comprises a spinner 2 defining the furthest upstream rotary part of the turbine engine.

The spinner 2, likewise of longitudinal axis L-L, is attached removably to the upstream end of the rotor 1 by attachment means (FIGS. 4 to 9) at its upstream end (upstream and downstream being defined in relation to the direction in which the gas stream flows through the turbine engine).

According to the invention, the attachment means comprise a dog clutch and rotation-proofing means to prevent the spinner 2 from rotating in relation to the rotor 1.

Figure 2:
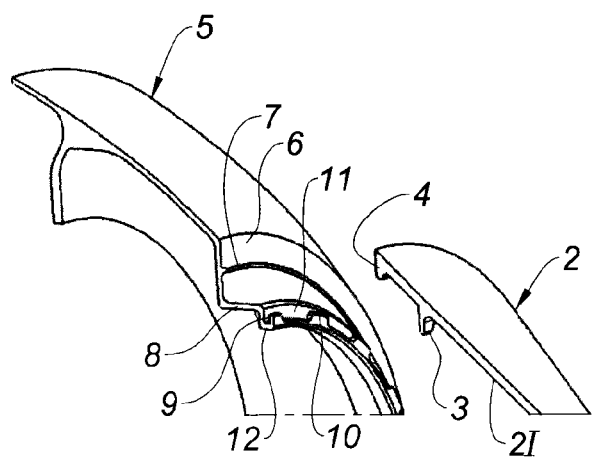
FIG. 2 is a schematic depiction, in a partially sectioned and exploded perspective view, of one example of an upstream flange of the fan rotor of FIG. 1, to which the spinner can be attached by a dog clutch coupling.
Figure 3:
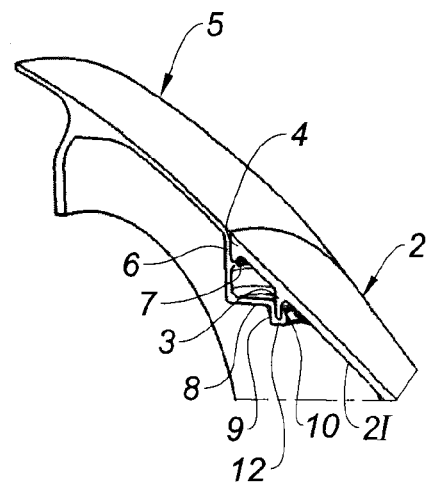
FIG. 3, which is similar to FIG. 2, shows the upstream flange assembled, by dog clutch coupling, to the spinner.

In particular, as FIGS. 2 and 3 show, the spinner 2 comprises, on its internal wall 21, a plurality of radial teeth 3 which are evenly distributed about a circumference of said wall 21. The downstream end of the spinner 2 comprises an annular portion 4 which belongs to a plane orthogonal to the axis L-L and which extends the internal wall 21 towards this axis.

Further, the fan rotor 1 comprises a machined frustoconical flange 5 to which the spinner 2 is intended to be removably attached.

The flange 5 comprises an annular radial land 6 against which the annular portion 4 of the spinner 2 can rest once this spinner has been assembled with the rotor 1. Further, the annular land 6 comprises, on its surface, an annular rib 7 against which the internal radial end of the annular portion 4 of the spinner 2 can rest.

The flange 5 also comprises a cylindrical extension 8 of axis L-L secured, at its downstream end, to the internal radial end of the annular land 6. The extension 8 at its upstream end comprises a groove 9 in which the teeth 3 of the spinner 2 can be housed.

In addition, the flange 5 comprises radial teeth 10 evenly distributed about a circumference thereof. The teeth 10, together with a radial annular wall 11 secured to the upstream end of the extension 8, delimit the groove 9 which is formed of a bottom 12 bearing the radial teeth 10.

Thus, the groove 9 and the teeth 3 and 10 form a dog clutch (or dog clutch coupling) that allows the spinner 2 to be connected to the fan rotor 1, via the upstream flange 5 thereof.

Moreover, in a first embodiment according to the present invention, and illustrated in FIGS. 4 to 6, the rotation-proofing means comprise two rotation-proofing pegs 13 which are diametrically opposed so as to maintain the dynamic balance of the fan rotor 1, and which are able, independently of one another, to occupy at least one of the following two positions:

a locked position (FIG. 4) in which the spinner 2 is prevented from rotating with respect to the fan rotor 1; and an unlocked position (FIG. 5) in which the spinner 2 is allowed to rotate with respect to the fan rotor 1.

As FIGS. 4 to 6 show, each rotation-proofing peg 13 comprises a cylindrical shank 14, of axis X-X, and a head 15 secured to one longitudinal end of the shank 14.

In this first example, the head 15 of the peg 13 is of flat rectangular shape. When a rotation-proofing peg 13 is in the locked position (FIG. 4), its head 15 is able to enter a corresponding main housing 16 formed in the wall directed toward the axis L-L of the cylindrical extension 8 of the flange 5.

Each main housing 16, which is flat-bottomed, has a cross section of a shape similar to that of the rectangular head 15 of the peg 13. The bottom of a housing 16 also comprises a hole 16A which passes through the wall of the extension 8 and in which the corresponding peg 13 can slide as a sliding fit.

It will be understood that, in the context of the first example, the flange 5 comprises two diametrically opposed main housings 16.

In the unlocked position (FIG. 5), the head 15 of each peg 13 rests against the outer edges of the associated main housing 16.

The transition of the rotation-proofing pegs 13 from the unlocked position to the locked position and vice versa is achieved by turning these pegs by a quarter of a turn about their axis X-X.

As FIGS. 4 and 5 show, a helical compression spring 17 has the shank 14 of each peg 13 passing through it. Each spring 17 bears, on the one hand, against the outwardly directed wall of the extension 8 of the flange 5, and, on the other hand, against an annular stop 18 formed of an elastic ring mounted in a groove 19 made in the lateral wall of the shank 14 of the corresponding peg 13.

Thus, each spring 17 is compressed when the associated rotation-proofing peg 13 is in the unlocked position, and is at least partially relaxed when the peg 13 is in the locked position.

Further, in this first example, the spinner 2 comprises two diametrically opposed auxiliary housings 20. Each auxiliary housing 20 is formed in the internal wall 21 of the spinner and has a shape that complements the free end 14L of the shank 14 of the corresponding peg 13 intended to be housed, as a sliding fit, in said auxiliary housing 20 when the peg 13 is in the locked position.

Thus, in the locked position, the spinner 2 cannot be turned with respect to the flange 5 of the rotor 1.

The spinner 2 also comprises two access through-holes 21 which extend radially and which open onto the exterior surface of said spinner 2. Each access hole 21 is intended to be positioned facing a hole 22 of the corresponding rotation-proofing peg 23 (for example of hexagonal section) which is formed in the outwardly oriented free end 14L thereof and able to accept an assembly tool (for example an Allen key) for effecting a translational movement of the peg along its axis X-X and turning it about this axis.

Because each rotation-proofing peg 13 is recessed in the spinner 2, an assembly tool of the Allen key type allows access to the peg 13 through the hole 21 made in the spinner 2 so that the peg can be pivoted about its axis X-X.

It should be noted that, to make it easier to insert the shank 14 of a peg 13 in the corresponding auxiliary housing 20, the free end 14L may be chamfered.

Moreover, according to the invention, the spinner 2 is fitted as follows.

First of all, the rotation-proofing means are unlocked by pressing on each of the pegs 13 in the direction of the axis L-L (which compresses the associated springs 17) until the head 15 of the peg comes out of the associated main housing 16. Once the head 15 is out, each peg 13 needs to be turned by 90° about its axis X-X and then released so that its head 15 rests against the outer edges of the associated housing 16.

Once this has been done, the spinner 2 can be mounted on the flange 5 of the rotor 1 using the dog clutch connection without interference with the rotation-proofing means. During this step, the spinner 2 is engaged axially on the flange 5 and is then pivoted about the axis L-L to bring the teeth 3 of the spinner 2 to face those 10 of the flange 5. This dog clutch connection provides axial retention of the spinner 2 in relation to the remainder of the fan rotor 1.

Finally, the rotation-proofing means are locked by pressing on each of the pegs 13 in the direction of the axis L-L so that they can then be pivoted through 90° about their axis X-X and released so that:
  their head 15 becomes housed in the corresponding main housing 16; and
  the free end 14L of the shank 14 of each peg 13 enters the associated auxiliary housing 20.

In the locked position, the head 15 of the pegs 13 is captive in the corresponding main housing 16, allowing the peg 13 to be immobilized in terms of rotation about its axis X-X.

Moreover, a rotation-proofing peg 13 is preferably mounted on the flange 5 as follows.

The peg 13 is initially engaged in the flange 5, through the hole 16A, from the inside until the head 15 of the peg 13 becomes housed in the corresponding main housing 16.

The compression spring 17 is then fitted around the shank 14 of the peg 13 from the outside until it comes to rest against the extension 8 of the flange 5.

The elastic ring 18 is fitted into the corresponding groove 19 of the shank 14 of the peg 13 so as to compress the spring 17, at least lightly, and thus keep the head 15 of the peg 13 bearing against the flat bottom of the housing 16.

Each rotation-proofing peg 13 is therefore held by the flange 5 via a pivoting-sliding connection.

In a second embodiment according to the invention and depicted in FIGS. 7 to 9, the rotation-proofing means comprise two rotation-proofing pegs 23 which are diametrically opposed and able, independently of one another, to occupy at least a locked position (FIG. 7) and an unlocked position (FIG. 8). Each rotation-proofing peg 23 is formed of a cylindrical shank 24 of axis X-X, and of a head 25 secured to one longitudinal end of the shank 24.

In this second example, the head 25 of the pegs 23 is in the form of a trapezoidal prism. When a rotation-proofing peg 23 is in the locked position (FIG. 7), its head 25 is inserted in a main housing 26 formed for that purpose in the flange 5 and the spinner 2 once these two have been joined together. In other words, the main housing 26 is defined when the spinner 2 is mounted on the flange 5 and correctly angularly oriented in relation thereto. That portion of the main housing 26 that is made in the flange 5 corresponds to a recess made in the annular land 6 and in the extension 8 of the flange 5. That portion of the main housing 26 that is formed in the spinner 2 is itself defined by a cutout made in the annular portion 4 of this spinner.

In the unlocked position (FIG. 8), the head 25 of each peg 23 bears, via a flat end face 25A, against at least one of the edges of the associated main housing 26.

As in the first example, the transition of the rotation-proofing pegs 23 from the unlocked position to the locked position and vice versa, occurs by rotating these pegs by a quarter of a turn about their axis X-X.

Moreover, a helical compression spring 27 has the shank 26 of each peg 23 passing through it. Each spring 27 bears, firstly, against the base 28 of the head 25 and, secondly, against the bottom of an auxiliary housing 29 formed in an intermediate support 30 secured to the flange 5.

Thus, each spring 27 is at least partially relaxed when the peg 23 is in the locked position, and compressed when the associated rotation-proofing peg 23 is in the unlocked position. In the latter position, the spring 27 is wholly housed in the auxiliary housing 29 and the base 28 of the head 25 of the peg 23 rests on the flat face of the intermediate support 30 surrounding the housing 29.

The bottom of each auxiliary housing 29 has a hole 29A passing through the intermediate support 30 and in which the corresponding peg 23 can slide, as a sliding fit, in order to move from the locked position to the unlocked position and vice versa.

The head 25 of each peg 23 also comprises a hole 31, for example of hexagonal cross section, intended to accept an assembly key, for example an Allen key, for translationally moving the peg 23 and turning it about its axis.

Such an assembly tool is inserted into the head 25 of each peg through an access hole 32 which is formed jointly by two cutouts made in the downstream end of the flange 5 and in the annular portion 4 of the spinner 2.

It will be appreciated that the spinner 2 is mounted on the flange 5 of the fan rotor 1 using operations similar to those described with reference to the first example of FIGS. 4 to 6.

The invention claimed is:

1. An assembly for a turbomachine having a longitudinal axis, the assembly comprising:
    a rotor;
    a spinner coaxial with the longitudinal axis and which is attached removably to an upstream end of the rotor, the spinner including a plurality of radial teeth;
    a flange provided at the upstream end of the rotor, the flange including a plurality of radial teeth and an annular groove which accommodates the radial teeth of the spinner to form a dog clutch; and
    at least one rotation-proofing peg which extends radially relative to said axis and which prevents the spinner from rotating with respect to the rotor,
    wherein said at least one rotation-proofing peg is carried by said flange and is able to occupy at least an unlocked position while being still carried by the flange, allowing the spinner to rotate with respect to the rotor, and a locked position, preventing any rotation of the spinner with respect to the rotor, said at least one rotation-proofing peg being urged into the locked position by a compression spring through which said at least one rotation-proofing peg passes.

2. The rotor according to claim 1, further comprising a main housing in which a head of said at least one rotation-proofing peg can be housed when said at least one rotation-proofing peg is in the locked position, and against outer edges of the main housing against which the head of said at least one rotation-proofing peg is able to rest when said at least one rotation-proofing peg is in the unlocked position.

3. The assembly according to claim 2, wherein the main housing is formed wholly in the flange and includes a bottom in which a hole is provided, said at least one rotation-proofing peg having a sliding fit with the hole.

4. The assembly according to claim 3, wherein an auxiliary housing is formed in an internal wall of the spinner and which is intended to accommodate a free end of the rotation-proofing peg, when said at least one rotation-proofing peg is in the locked position.

5. The assembly according to claim 2, wherein the main housing is formed in the flange and the spinner when the flange and spinner are joined together.

6. The assembly according to claim 1, wherein the spinner comprises a hole which opens onto an outer surface of the spinner and is positioned facing a hole for the at least one rotation-proofing peg which is formed in an outwardly facing end thereof and able to accept an assembly tool for translationally moving the rotation-proofing peg and turning said at least one rotation-proofing peg about its axis.

7. The assembly according to claim 1, wherein the compression spring can be compressed, when the at least one rotation-proofing peg is in the unlocked position, and can be at least partially relaxed when the least one rotation-proofing peg is in the locked position.

8. A turbomachine which comprises an assembly according to claim 1.

9. The assembly according to claim 1, wherein a head of the at least one rotation-proofing peg is rectangular.

10. An assembly for a turbomachine having a longitudinal axis, the assembly comprising:
    a rotor;
    a spinner coaxial with the longitudinal axis and which is attached removably to an upstream end of the rotor, the spinner including a plurality of radial teeth;
    a flange provided at the upstream end of the rotor, the flange including a plurality of radial teeth and an annular groove which accommodates the radial teeth of the spinner to form a dog clutch; and
    a rotation-proofing peg which prevents the spinner from rotating with respect to the rotor,
    wherein the rotation-proofing peg is able to occupy at least an unlocked position, allowing the spinner to rotate with respect to the rotor, and a locked position, preventing any rotation of the spinner with respect to the rotor, the rotation-proofing peg being urged into the locked position by a compression spring through which the rotation-proofing peg passes,
    wherein the flange includes a main housing including a hole through which the rotation-proofing peg passes, an axis of the hole extending radially, a head of the rotation-proofing peg being housed in the main housing when the rotation-proofing peg is in the locked position, and the head of the rotation-proofing peg resting against outer edges of the main housing at a radially inner side of the flange when the rotation-proofing peg is in the unlocked position, and
    wherein the rotation-proofing peg is inserted radially into the main housing of the flange such that an axis of the rotation-proofing peg is perpendicular to the longitudinal axis.

* * * * *